United States Patent [19]
Kaneko

[11] Patent Number: 5,189,559
[45] Date of Patent: Feb. 23, 1993

[54] OPTICAL APPARATUS HAVING A ZOOM MECHANISM

[75] Inventor: Yoshiyuki Kaneko, Kawasaki, Japan

[73] Assignee: Canon Kabushiki Kaisha, Tokyo, Japan

[21] Appl. No.: 786,180

[22] Filed: Oct. 31, 1991

[30] Foreign Application Priority Data

Nov. 2, 1990 [JP] Japan .................................. 2-297616

[51] Int. Cl.$^5$ ............................................ G02B 15/14
[52] U.S. Cl. .................... 359/697; 359/694; 354/400; 358/225
[58] Field of Search ............... 359/698, 695, 696, 697, 359/694, 684, 824; 354/402, 400, 195.1, 195.12; 358/225, 227

[56] References Cited

U.S. PATENT DOCUMENTS

| | | | |
|---|---|---|---|
| 4,161,756 | 7/1979 | Thomas | 358/225 |
| 4,950,054 | 8/1990 | Wada et al. | 359/684 |
| 4,976,523 | 12/1990 | Ishikawa | 359/684 |

Primary Examiner—Loha Ben
Attorney, Agent, or Firm—Robin, Blecker, Daley & Driscoll

[57] ABSTRACT

An optical apparatus having a zoom mechanism for zooming comprised of a plurality of groups of lens groups driven independently of one another by a plurality of motors comprises driving apparatus for driving the plurality of motors at substantially constant speed during zooming, and control apparatus for compensatively moving one of the lens units on the basis of the positional information of another of the lens units upon stopping thereof during the stoppage of the zooming.

15 Claims, 8 Drawing Sheets

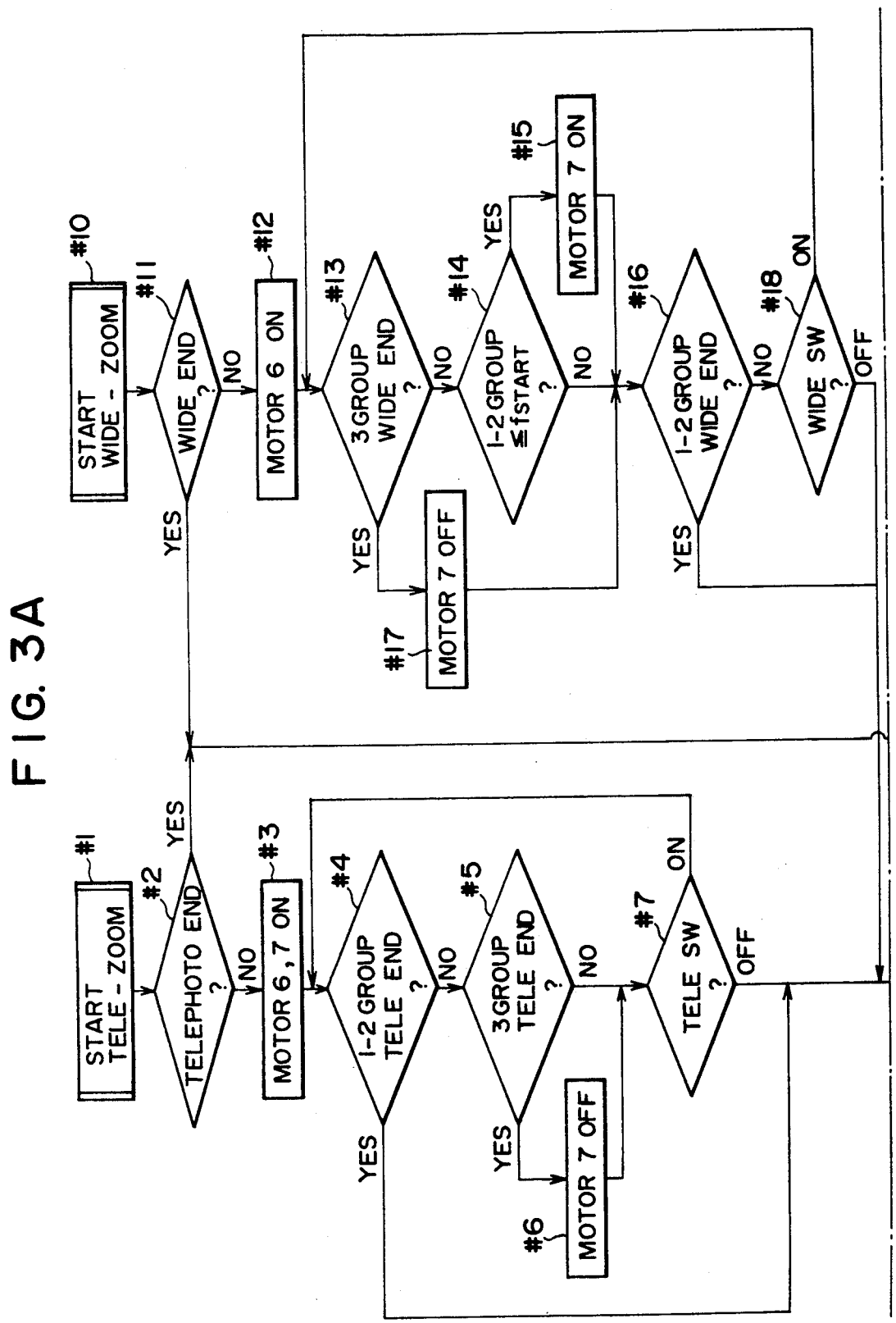

5,189,559

OPTICAL APPARATUS HAVING A ZOOM MECHANISM

BACKGROUND OF THE INVENTION

1. Field of the Invention

This invention relates to an optical apparatus such as a lens barrel or a camera having a zoom mechanism.

2. Related Background Art

Heretofore, the driving of a power zoom lens driven by a motor has been effected by a motor and a cam ring. That is, design has been made such that each group constituting the zoom lens is moved by the use of a cam ring, and the zoom lens has been driven by rotating this cam ring by a motor.

However, an attempt to drive all groups by the interlocking of a cam gives rise to a limitation in the downsizing of a zoom lens barrel. Also, the required dimensional accuracy of the cam becomes more and more severe for a lengthened focus of zoom.

The use of a plurality of drive sources, to move the groups independently of one another would seem to thereby make the lens barrel compact. Also, if the respective groups can be moved independently of one another, even complicated control will become possible by using calculating means such as a microcomputer, and it will also become easy to control a lens of the rear focus type which has been difficult to realize by the conventional driving system using only a cam.

However, where the zooming operation is performed by the use of a plurality of motors, there arises the problem that zoom control cannot be simply accomplished.

That is, the movement speeds of the respective groups entirely differ from one another depending on the driving system. For example, where a cam is used, even if the speeds of the motors are constant, the movement speeds are varied by the angle of a cam slot, and where helicoid is used, the movement speeds are proportional to the driving speeds of the motors. Generally, the positional relation between optical groups by zooming is not a linear relation and therefore, if the drive motors for the respective groups are simply driven at a constant speed, the relation will become such that the movement of some group is great and the movement of other groups is small.

An attempt to control the speeds of the motors to thereby satisfy the relation between the optical groups would result in very complicated control, and this will be impossible if considered as an extension of the conventional motor driving method.

SUMMARY OF THE INVENTION

One aspect of this invention is to premise, in an optical apparatus having a zoom mechanism for driving a plurality of groups independently of one another by a plurality of motors, that the rotational speed of each motor be made constant, and correct the deviation of each lens group from a predetermined position caused by a zoom change, after the zooming operation or before the start of the zooming operation.

BRIEF DESCRIPTION OF THE DRAWINGS

FIGS. 3A and 3B are flow charts showing the substance of zoom control.

DESCRIPTION OF THE PREFERRED EMBODIMENT

Figure 1:
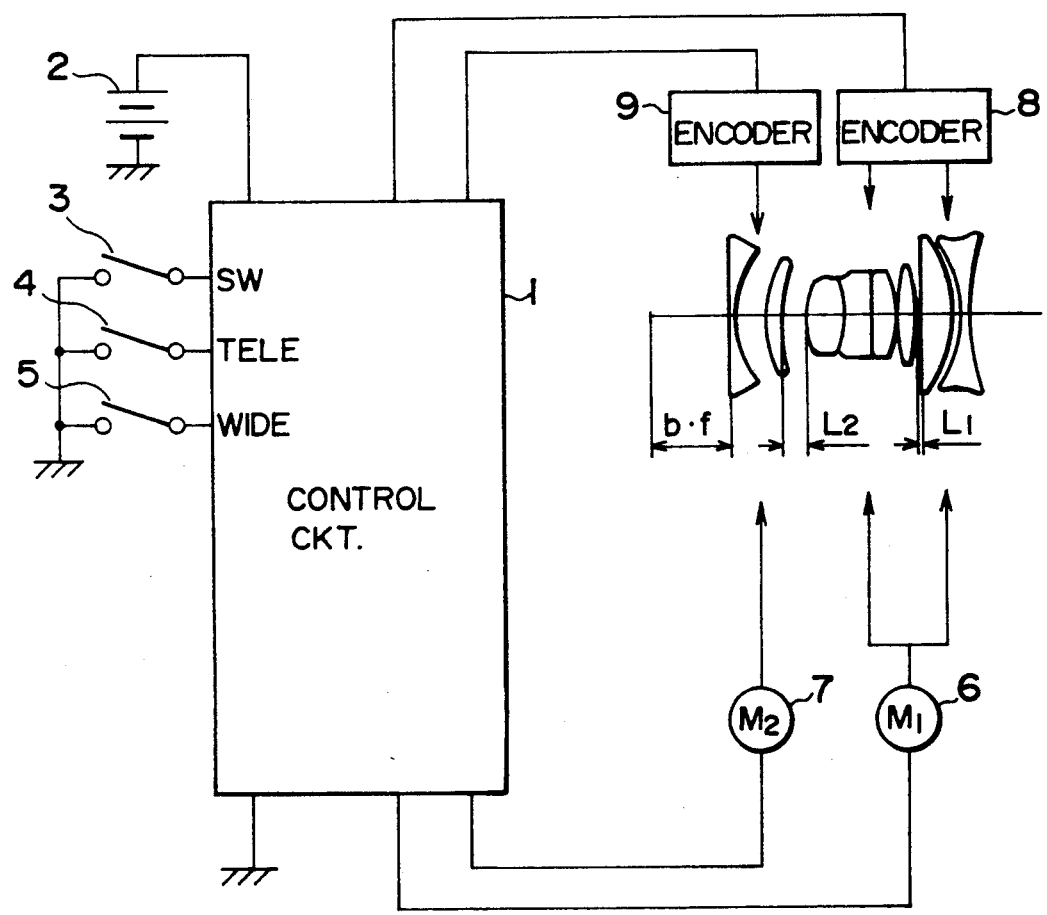
FIG. 1 is a diagram of the zoom driving circuit of a camera which is an embodiment of the present invention.

FIG. 1 diagrammatically shows the zoom driving circuit of a camera which is an embodiment of the present invention. The lens of the camera is a three-group type zoom lens which is designed such that first and second groups are driven by a cam and a third group is driven by a helicoid.

In FIG. 1, the reference numeral 1 designates a control circuit for effecting the control of the entire camera, the reference numeral 2 denotes a power source, the reference numeral 3 designates a release switch, the reference numeral 4 denotes a TELE zooming switch, the reference numeral 5 designates a WIDE zooming switch, the reference numeral 6 denotes a motor for driving a cam for moving the first and second groups, the reference numeral 7 designates a motor for driving a helicoid for moving the third group, the reference numeral 8 denotes an encoder for detecting the positions of the first and second groups, and the reference numeral 9 designates an encoder for detecting the position of the third group.

The first and second groups are operatively associated with the movement of the zoom lens barrel itself of the camera and are driven to predetermined positions by the cam. On the other hand, the third group is within the lens barrel and its movement cannot be seen from outside. So, control is effected with the positions of the first and second groups as the standard. The positions of the first and second groups are detected by the encoder 8, and the third group is driven to a position conforming thereto by the use of the encoder 9. The outputs of the encoders 8 and 9 are monitored during the motor driving as well. At this time, driving is effected while the whereabouts of each group as well as the telephoto end and the wide end are checked.

Figure 2:
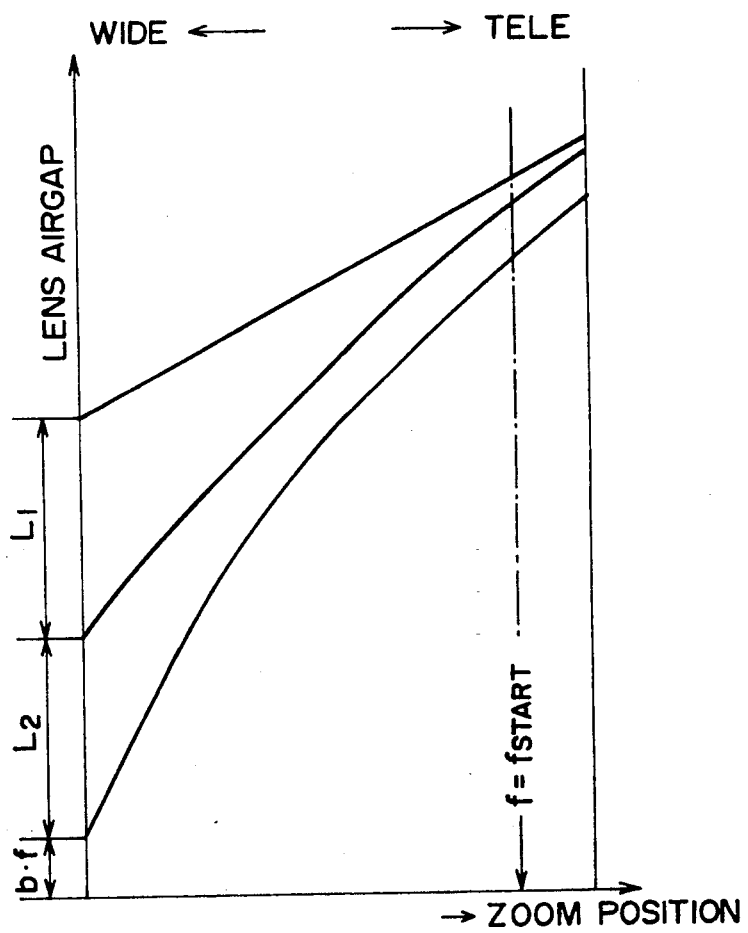
FIG. 2 is a graph showing the optical positional relations between various groups, i.e., the air gaps between the groups.

FIG. 2 is a graph showing the optical positional relations between the groups, i.e., the air gaps between the groups. L1 is the gap between the first and second groups, L2 is the gap between the second and third groups, and b.f is the distance from the third group to the surface of film. In FIG. 2, the abscissa represents time and the ordinates represents the positions of the respective groups. The abscissa adopts as the standard the amounts of movement of the first and second groups when the motor 6 for driving the first and second groups is driven at a predetermined speed. The third group is at a position optically corresponding to the positions of the first and second groups.

It can be seen from FIG. 2 that when the motor for driving the first and second groups is driven at a predetermined speed, the balance of the whole cannot be kept unless the movement of the third group is made fast on the WIDE side and slow on the TELE side. That is, it is necessary that the movement speed of the third group be delicately varied in conformity with the zoom position.

Further, the actual driving speed of the first and second groups is varied during the starting and stoppage thereof, and is also varied by conditions such as the power source, posture and temperature of the camera. It is very difficult to control the speed of the third group so as to satisfy such conditions, and when the fluctuation factor of the speed of the first and second group is taken into consideration, a great effect cannot be expected even if the speed of the third group is controlled complicatedly.

Accordingly, it is realistic to find a suitable speed for the third group and drive the third group under predetermined conditions.

The third group is driven by a helicoid and thus, it will move at a uniform speed if the speed of the motor is constant. For example, let it be assumed that the speeds of the motors 6 and 7 are set so that the first and second groups and the third group may be about the same in the variation as the focal length on the TELE side. Thereupon, the amount of movement required for the third group on the WIDE side is great and thus, necessarily the third group becomes slow on the WIDE side relative to the first and second groups.

Conversely, let it be assumed that the speeds of the motors 6 and 7 are set so that the zoom speeds of the first and second groups and the third group may coincide with each other on the WIDE side. The amount of movement required for the third group on the TELE side is smaller than on the WIDE side and thus, on the TELE side, the third group will become faster than the first and second groups even if the speeds of the motors are made constant.

So, the speeds of the motors 6 and 7 are set to such a degree that as a variation in the focal length, the third group is somewhat slower on the WIDE side than the first and second groups. This is because if TELE is adopted as the standard, the third group will without fail be slower on the WIDE side and if the speeds are set with the wide end completely as the standard, the third group will always precede.

Figure 3B:
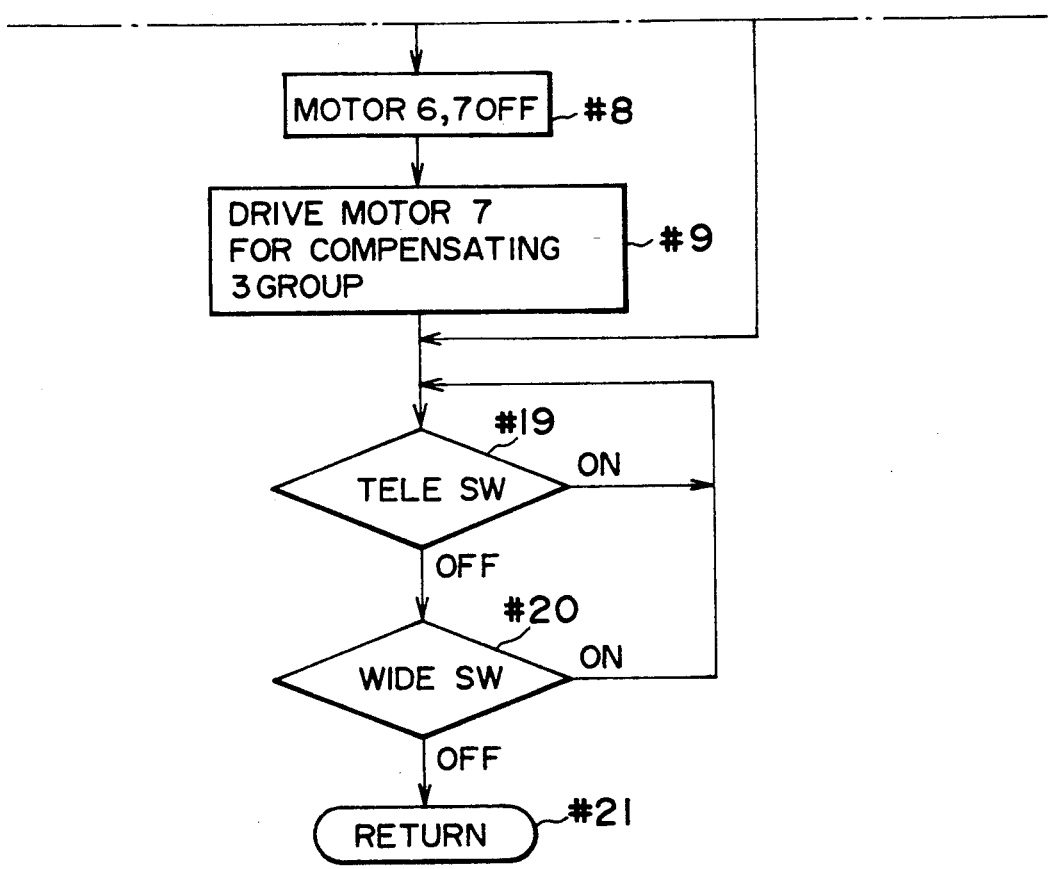

The zooming operation will now be described with reference to FIG. 3 which is a flow chart showing the substance of zoom control.

Description will first be made of a case where a TELE zooming button has been depressed to close the switch 4. When the TELE zooming button is depressed, the operation of the control circuit 1 shifts from the control of the entire camera to the step #1 of FIG. 3. The control of the entire camera referred to herein involves operations such as general release and film feeding, and need not be described.

Advance is made from #1 to #2, where whether the lens is at the telephoto end is checked by the encoder 8. If the lens is already at the telephoto end, TELE zooming cannot be done and therefore, the program enters the loop of #19 in which it is waited for the switch 4 corresponding to the TELE zooming button or the switch 5 corresponding to the WIDE zooming button to be opened.

If the lens is not at the telephoto end, at #3, the motor 6 for driving the first and second groups and the motor 7 for driving the third group are electrically energized. At #4, whether the positions of the first and second groups are at the telephoto end is checked by the encoder 8. If the first and second groups are at the telephoto end, advance is made to #8, where the zoom terminating operation is started.

If the first and second groups, are not at the telephoto end, at #5, whether the third group is not at the telephoto end is checked by the encoder 9. If the third group is not at the telephoto end, at #7, whether the TELE zooming switch 4 is closed is checked. If the switch 4 is closed, return is made to #4, where zooming is continued, and if the switch 4 is open, advance is made to #8, where the zoom terminating operation is started.

If at #5, the third group is at the telephoto end, the motor 7 for driving the third group is electrically deenergized and advance is made to #7.

When the first and second groups come to the telephoto end or the TELE zooming switch 4 is opened, advance is made to #8, where the motors 6 and 7 are electrically deenergized. At #9, the motor 7 is driven so that the third group may assume the relation of FIG. 2 to the positions of the first and second groups input by the encoder 8. Thus, the first, second and third groups are stopped at a proper zoom position.

At #19, the opening of the TELE zooming switch 4 is waited for, and at #20, the opening of the WIDE zooming switch 5 is waited for, and when these switches are opened, advance is made to #21, and return is made to the control of the entire camera.

Description will now be made of a case where the WIDE zooming button is depressed. When the WIDE zooming button is depressed to close the switch 5, the operation of the control circuit 1 shifts from the control of the entire camera to the operation of #10 of FIG. 3.

If the lens is not at the wide end, at #12, the motor 6 for driving the first and second groups is electrically energized. At this time, however, the motor 7 for driving the third group is not electrically energized.

At #13, whether the position of the third group is not at the wide end is checked by the encoder 9. If the third group is not at the wide end, at #14, whether the first and second groups are more toward the WIDE side than a focal length fSTART for which the driving of the third group is started is checked by the encoder 8. If the first and second groups are more toward the WIDE side than fSTART, at #15, the motor 7 for driving the third group is electrically energized.

At #16, whether the first and second groups are not at the wide end is checked. If the first and second groups are at the wide end, advance is made to #8, where the zoom terminating operation is started.

If the first and second groups are not at the wide end, at #18, whether the WIDE zooming switch 5 is closed is checked. If the switch 5 is closed, return is made to #13, where zooming is continued, and if the switch 5 is open, advance is made to #8, where the zoom terminating operation is started.

If at #13, the third group is at the wide end, the motor 7 for driving the third group is electrically deenergized and advance is made to #16. That is, if the first and second groups have not yet arrived at the wide end and the third group has come to the wide end, the routine of #14 and #15 in which the motor 7 for driving the third group is started is not passed through.

When the first and second groups come to the wide end or the WIDE zooming switch 5 is opened, advance is made to #8, where just the same operation as the TELE zoom terminating operation is performed.

Description will now be made of the reason why zooming can be accomplished well by this zoom operation. As previously described, the speeds of the motors 6 and 7 are set to such a degree that as a variation in the focal length, the third group is a little faster on the WIDE side than the first and second groups.

In the case of TELE zoom, as can be seen from FIG. 2, on the WIDE side, the third group is rather slow relative to the first and second groups and on the TELE side, it outpaces the first and second groups. Accordingly, if the motors 6 and 7 are started at a time, the lens will be substantially ideally zoomed on the WIDE side, but on the TELE side, the third group will outpace the first and second groups.

However, at #5 to #6, the third group stops at the telephoto end and therefore, the amount outpaced by the third group can be compensated for at #9. Here, the amount of movement of the position of the third group on the TELE side is originally small and therefore, the amount compensated for at #9, i.e., the time delay by the operation of #9, is small and little affects the feeling of operation.

Figure 4:
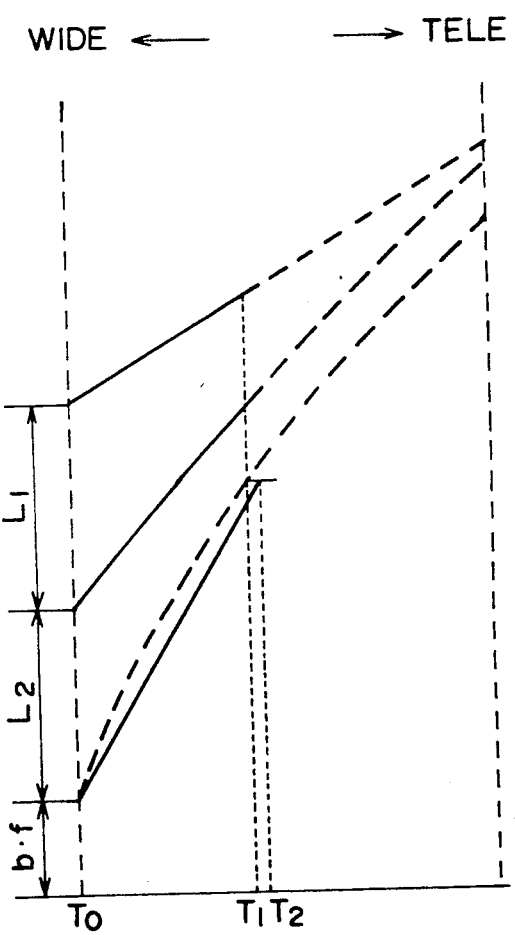
FIGS. 4 to 7 show the movement timings of the respective groups during zooming.
Figure 5:
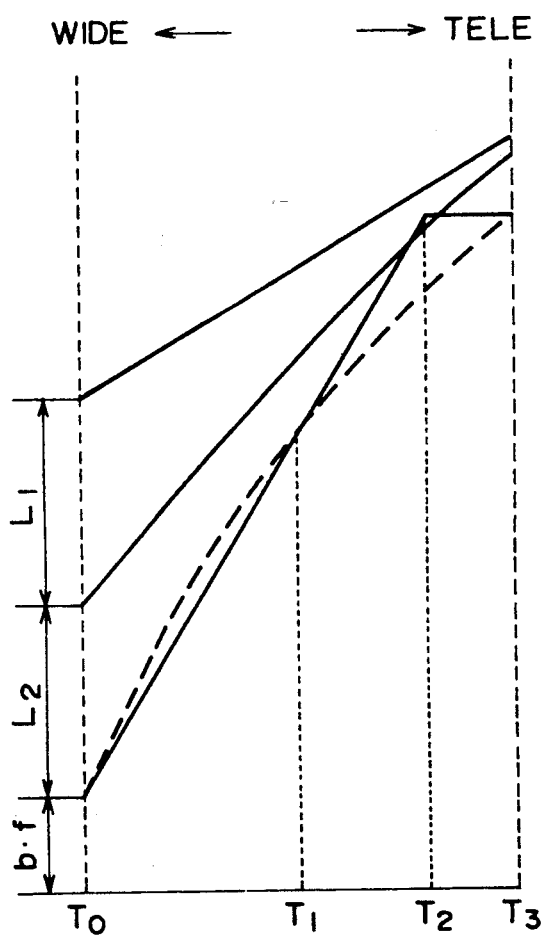

FIG. 4 shows the movement timings of the respective groups when the lens is zoomed from WIDE to MIDDLE, and FIG. 5 shows the movement timings of the respective groups when the lens is zoomed from WIDE to TELE.

In FIG. 4, the driving of each group is started from $T_0$. The third group becomes rather slow, and if at $T_1$, the TELE zooming switch 4 is opened, the first and second groups are stopped, and at the time $T_1 - T_2$, the third group is compensatively driven to a position corresponding to a position of the first and second groups.

In FIG. 5, the driving of each group is started from $T_0$. At first, the third group is slow, and at $T_1$, it catches up with the first and second groups, whereafter the third group precedes the other groups. At $T_2$, the third group arrives at the telephoto end and is stopped. At $T_3$, the first and second groups also arrive at the telephoto end and zoom comes to an end. If during $T_1 - T_3$, the TELE zooming switch 4 is opened, the amount of excessive movement of the third group can be corrected after the stoppage of the first and second groups.

On the other hand, in the case of WIDE zoom, if the motors 6 and 7 are started at a time, zoom will be suitably accomplished when start is made from the WIDE side rather than the vicinity of MIDDLE, but the third group will greatly outpace the first and second groups at first when start is made from the vicinity of TELE. The difference becomes smaller as WIDE is approached, but when TELE zoom is effected only a little, the compensating operation of #9 is entered while the third group remains outpacing the first and second groups greatly and therefore, the time of #9 becomes long and the feeling of operation becomes very bad.

So, the timing at which the third group is started at #14 - #15 is delayed until the focal length fSTART is reached. Thereby, any excess compensating operation is prevented from being brought in by the driving of the third group unnecessary on the TELE side. Also, on the WIDE side, the first and second groups and the third group are started at a time and therefore, a suitable zooming operation is brought about.

Figure 6:
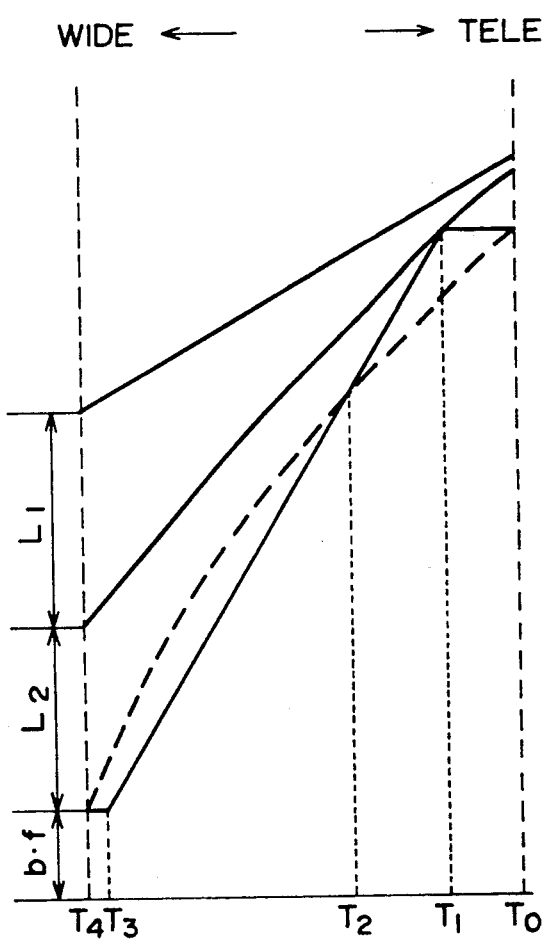

FIG. 6 shows the movement timings of the respective groups when the lens is zoomed from TELE to WIDE.

In FIG. 6, the driving of the first and second groups is started from $T_0$. The third group begins to be driven when the first and second groups reach fSTART at $T_1$. The third group is behind the first and second groups till $T_2$, but from $T_2$, the third group precedes the first and second groups, and at $T_3$, the third group arrives at the wide end and at $T_4$, the first and second groups arrive at the wide end. The amount by which the third group is behind or precedes the first and second groups in the meantime is small, and wherever the WIDE zooming switch 5 is opened, the last amount of compensation of the third group will be small.

Figure 7:
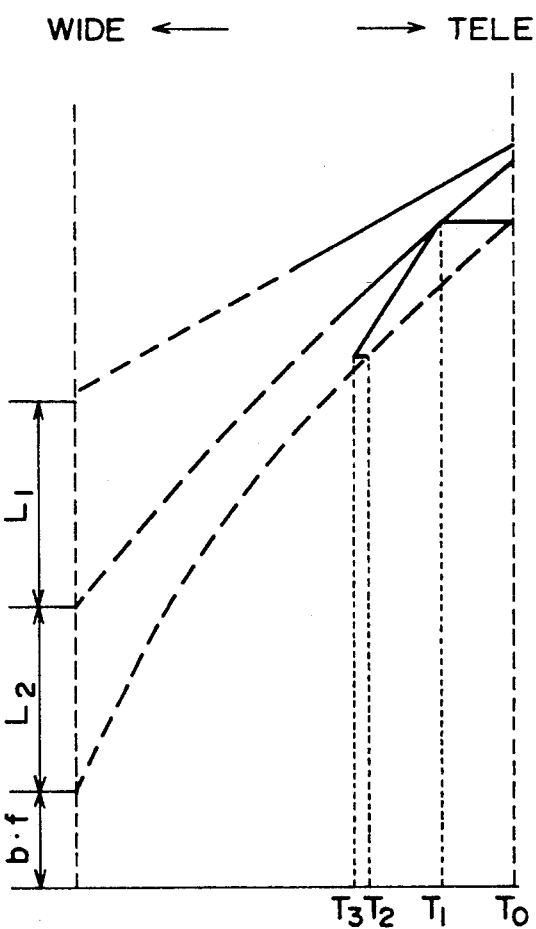

FIG. 7 shows the movement timings of the respective groups when the lens is zoomed from TELE to MIDDLE.

In FIG. 7, at $T_0$, the driving of the first and second groups is started, and at $T_1$, the driving of the third group is started. At $T_2$, the WIDE zooming switch 5 is opened and the first and second groups are stopped, and during $T_2 - T_3$, the compensation of the third group is effected.

Other Embodiment

The above-described embodiment of the present invention is for a lens which performs the zooming operation as shown in FIG. 2, but simple and suitable control can also be effected for a lens of different type if the timing of the starting of each motor is changed together with the driving system for each group. In this case, in what sequence the starting of which motor is changed and to what degree the driving speeds of the motors are set depend on the system.

Also, where not DC motors but stepping motors are employed as the motors, there is a great limitation in the determination of the driving speeds of the motors. That is, the characteristics themselves of the stepping motors are given top priority to avoid the loss of synchronism of the stepping motors. Even where it is difficult to set the speeds of the motors arbitrarily, the speeds can be adjusted to a certain degree during the designing of the reduction ratio or the like of gears and the timing of starting can be changed in conformity therewith.

In a system wherein an attempt to effect zooming in accordance with optical conditions would originally lead to the necessity of changing the speeds of the motors delicately at the zoom position, one lens can be compensatively moved with the other lens as the standard or the timing of starting of each motor can be changed after the stoppage of zoom driving, thereby controlling the motors with the driving speeds thereof being constant. Thereby, conditions regarding the control become simple with a result that simple and stable control can be accomplished.

Also, where not DC motors but motors such as stepping motors of which it is difficult to change the speeds delicately are employed as the motors, the system according to the present embodiment which controls the motors with the driving speeds thereof being constant will be very effective.

What is claimed is:

1. An optical apparatus having a zoom mechanism for zooming comprised of a plurality of groups of lens units driven independently of one another by a plurality of motors, said optical apparatus comprising:
   (a) driving means for respectively driving said plurality of motors at substantially constant speed during zooming; and
   (b) control means for compensatively moving one of said lens units on a basis of a positional information of a stopped other lens unit during a stoppage of said zooming.

2. An optical apparatus according to claim 1, wherein said control means compensatively moves said one lens to a position corresponding to a preset position of said other lens unit.

3. An optical apparatus according to claim 1, wherein said one lens unit and said other lens unit have their positions detected by position detecting means.

4. An optical apparatus according to claim 3, wherein said control means compensatively moves said one lens unit to a position corresponding to a preset position of said other lens unit.

5. An optical apparatus according to claim 1, wherein said lens units for zooming include at least a magnification changing lens unit and a lens unit for focus correction during magnification change.

6. An optical apparatus having a zoom mechanism for zooming comprised of a plurality of groups of lens units driven independently of one another by a plurality of motors, said optical apparatus comprising:
 (a) driving means for driving said plurality of motors at different speeds during zooming; and
 (b) control means for correcting only one of said lens units by a predetermined amount of correction before the start of said zooming by said driving means, and then effecting the driving of both of said one lens unit and another lens unit by said driving means.

7. An optical apparatus according to claim 6, wherein said control means compensatively moves said one lens unit to a position corresponding to a preset position of said other lens unit.

8. An optical apparatus according to claim 6, wherein said one lens unit and said other lens unit have their positions detected by position detecting means.

9. An optical apparatus according to claim 8, wherein said control means compensatively moves said one lens unit to a position corresponding to a preset position of said other lens unit.

10. An optical apparatus according to claim 8, wherein said control means compensatively moves said one lens unit to a position corresponding to a preset position of said other lens unit.

11. An optical apparatus according to claim 6, wherein said lens units for zooming include at least a magnification changing lens unit and a lens unit for focus correction during magnification change.

12. An optical apparatus having a zoom mechanism for for zooming comprised of a plurality of groups of lens units driven independently of one another by a plurality of motors, said optical apparatus comprising:
 (a) driving means for driving said plurality of motors respectively at constant speed during zooming operation; and
 (b) control means for correcting only one of said lens units by a predetermined amount of correction before the start of said zooming operation by said driving means, and then effecting the driving of both of said one lens unit and another lens unit by said driving means.

13. An optical apparatus according to claim 12, wherein said control means compensatively moves said one lens unit to a position corresponding to a preset position of said other lens unit.

14. An optical apparatus according to claim 12, wherein said one lens unit and said other lens unit have their positions detected by position detecting means.

15. An optical apparatus according to claim 12, wherein said lens units for zooming include at least a magnification changing lens unit and a lens unit for focus correction during magnification change.

* * * * *

UNITED STATES PATENT AND TRADEMARK OFFICE
CERTIFICATE OF CORRECTION

PATENT NO. : 5,189,559
DATED : February 23, 1993
INVENTOR(S) : Yoshiyuki Kaneko

It is certified that error appears in the above-indentified patent and that said Letters Patent is hereby corrected as shown below:

Column 2, line 51, change "represents" to --represent --.

Column 6, line 59, change "a" to -- the --. (both occurrence).

Column 8, line 10, delete "for" (first occurrence).

Signed and Sealed this

First Day of February, 1994

Attest:

BRUCE LEHMAN

Attesting Officer

Commissioner of Patents and Trademarks